US009545831B2

(12) United States Patent
    Willems

(10) Patent No.: US 9,545,831 B2
(45) Date of Patent: Jan. 17, 2017

(54) ACTIVE DAMPER SYSTEM

(71) Applicant: AUDI AG, Ingolstadt (DE)

(72) Inventor: Marco Willems, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 14/760,246

(22) PCT Filed: Dec. 11, 2013

(86) PCT No.: PCT/EP2013/003737
§ 371 (c)(1),
(2) Date: Jun. 6, 2016

(87) PCT Pub. No.: WO2014/108155
PCT Pub. Date: Jul. 17, 2014

(65) Prior Publication Data
US 2016/0311286 A1 Oct. 27, 2016

(30) Foreign Application Priority Data

Jan. 11, 2013 (DE) .................. 10 2013 000 371

(51) Int. Cl.
B60G 13/00 (2006.01)
B60G 17/00 (2006.01)
(Continued)

(52) U.S. Cl.
CPC ........... *B60G 17/0165* (2013.01); *B60G 7/006* (2013.01); *B60G 7/02* (2013.01); *B60G 13/003* (2013.01);
(Continued)

(58) Field of Classification Search
CPC combination set(s) only.
See application file for complete search history.

(56) References Cited

U.S. PATENT DOCUMENTS 5,072,801 A * 12/1991 Freymann .............. B62D 37/04
                                                180/68.5
5,174,552 A * 12/1992 Hodgson ................ B64D 27/26
                                                180/300
(Continued)

FOREIGN PATENT DOCUMENTS

CN      102168732 A    8/2011
DE         4219151     1/1993
(Continued)

OTHER PUBLICATIONS

Chinese Search Report issued on Jun. 1, 2016 with respect to counterpart Chinese patent application 20138007016.1.

(Continued)

*Primary Examiner* — Yonel Beaulieu
(74) *Attorney, Agent, or Firm* — Henry M. Feiereisen LLC

(57) ABSTRACT

An active damper system for damping high-frequency vibration excitation of the vehicle body, includes a damper bearing to support a vehicle chassis component on the vehicle body, wherein the damper bearing includes a first bearing element for fastening to the vehicle body and a second bearing element for fastening to the vehicle chassis component; an active actuating element connecting the first and second bearing elements; a first acceleration sensor for measuring an acceleration of the vehicle body; a control unit connected to the acceleration sensor and receiving a vertical acceleration of the vehicle body as input variable from the acceleration sensor, wherein the control unit influences the active actuation element. The active damper system includes a second acceleration sensor arranged on the second bearing element.

4 Claims, 2 Drawing Sheets

(51) Int. Cl.

| | | |
|---|---|---|
| *F16F 9/00* | (2006.01) | |
| *B60G 17/0165* | (2006.01) | |
| *B60G 7/00* | (2006.01) | |
| *B60G 7/02* | (2006.01) | |
| *B60G 15/00* | (2006.01) | |
| *F16F 9/54* | (2006.01) | |
| *F16F 15/00* | (2006.01) | |
| *F16F 15/02* | (2006.01) | |
| *G01P 15/00* | (2006.01) | |

(52) U.S. Cl.
CPC ............... *B60G 15/00* (2013.01); *F16F 9/54* (2013.01); *F16F 15/002* (2013.01); *F16F 15/02* (2013.01); *G01P 15/00* (2013.01); *B60G 2204/11* (2013.01); *B60G 2204/112* (2013.01); *B60G 2204/12* (2013.01); *B60G 2204/143* (2013.01); *B60G 2204/15* (2013.01); *B60G 2204/41* (2013.01); *B60G 2204/62* (2013.01); *B60G 2400/102* (2013.01); *B60G 2400/91* (2013.01); *B60G 2800/162* (2013.01); *B60G 2800/916* (2013.01)

(56) References Cited

U.S. PATENT DOCUMENTS

| | | | | |
|---|---|---|---|---|
| 5,269,558 | A * | 12/1993 | Yoshioka | F16F 9/462 |
| | | | | 188/266.4 |
| 5,301,111 | A * | 4/1994 | Utsui | B60G 17/0157 |
| | | | | 280/5.507 |
| 5,367,459 | A * | 11/1994 | Shtarkman | B60G 17/018 |
| | | | | 180/197 |
| 6,353,273 | B1 * | 3/2002 | Heshmat | F16C 17/024 |
| | | | | 310/90.5 |
| 6,965,181 | B1 * | 11/2005 | Heshmat | F16C 17/024 |
| | | | | 310/90.5 |
| 7,654,746 | B2 * | 2/2010 | Ladra | F16C 19/527 |
| | | | | 384/490 |
| 8,186,490 | B2 * | 5/2012 | Melz | F16F 15/00 |
| | | | | 188/266.7 |
| 2006/0225977 | A1 * | 10/2006 | Melz | F16F 15/007 |
| | | | | 188/266.7 |
| 2007/0212939 | A1 * | 9/2007 | Melz | F16F 15/00 |
| | | | | 439/589 |
| 2009/0071772 | A1 * | 3/2009 | Cho | B60G 17/016 |
| | | | | 188/266.4 |
| 2010/0057260 | A1 * | 3/2010 | Fallahi | F16F 7/1005 |
| | | | | 700/280 |
| 2010/0109219 | A1 * | 5/2010 | Melz | F16F 15/007 |
| | | | | 267/140.15 |
| 2010/0228422 | A1 * | 9/2010 | Gartner | B60G 17/0165 |
| | | | | 701/31.4 |
| 2013/0049508 | A1 | 2/2013 | Willems | |
| 2013/0154277 | A1 | 6/2013 | Willems | |
| 2013/0154404 | A1 | 6/2013 | Willems | |
| 2013/0320791 | A1 | 12/2013 | Willems | |
| 2015/0091228 | A1 * | 4/2015 | Hoffmann | F16F 13/00 |
| | | | | 267/140.14 |

FOREIGN PATENT DOCUMENTS

| | | |
|---|---|---|
| DE | 4230800 | 9/1994 |
| DE | 19642827 | 10/1997 |
| DE | 19935391 | 2/2001 |
| DE | 10039763 | 2/2002 |
| DE | 10122542 | 2/2002 |
| DE | 10205557 | 7/2003 |
| DE | 103 02 790 B3 | 7/2004 |
| DE | 102004032470 | 1/2006 |
| DE | 102008053001 | 10/2009 |
| DE | 102008046876 | 3/2010 |
| DE | 102009016252 | 10/2010 |
| EP | 1484201 | 12/2004 |
| EP | 1529982 | 5/2005 |
| JP | H0396412 | 4/1991 |
| WO | WO 2005/001308 | 1/2005 |

OTHER PUBLICATIONS

Translation of Chinese Search Report issued on Jun. 1, 2016 with respect to counterpart Chinese patent application 20138007016.1.
International Search Report issued by the European Patent Office in International Application PCT/EP2013/003737 on Dec. 11, 2013.

\* cited by examiner

ACTIVE DAMPER SYSTEM

CROSS-REFERENCES TO RELATED APPLICATIONS

This application is the U.S. National Stage of International Application No. PCT/EP2013/003737, filed Dec. 11, 2013, which designated the United States and has been published as International Publication No. WO 2014/108155 and which claims the priority of German Patent Application, Serial No. 10 2013 000 371.7, filed October Jan. 11, 2013, pursuant to 35 U.S.C. 119(a)-(d).

BACKGROUND OF THE INVENTION

The invention relates to an active damper system for damping high-frequency vibrating excitation of the vehicle structure.

According to the state of the art, as disclosed in DE 10 2008 046 876 A1, it is known to optimize vibration between wheel and vehicle body by passive damper systems, which for example in a suspension strut are used below a piston cylinder arrangement, and are influenced so that a damping of the vehicle body is achieved.

According to DE 10 2008 046 876 A1, the damping of vibrations can be determined by adjustment of the damping force. The damping force is achieved by controlling an actuating device by which the vertical acceleration of the vehicle structure and the vertical acceleration of a wheel are measured by a sensor. By means of a signal processing device, a control signal for the actuating device of the dual modular damping force is generated by a signal processing device.

SUMMARY OF THE INVENTION

A disadvantage of this process is that the entire spring damper element has to be influenced to prevent the transfer of vibration, which again impacts the driving behavior.

It is an object of the invention, to propose an improved device for damping the vehicle body as well as a corresponding method.

The object is achieved by an active damper system for damping high-frequency vibration excitation of the vehicle body, including a damper bearing to support a vehicle chassis component on the vehicle body said damper bearing including a first bearing element for fastening to the vehicle body and a second bearing element for fastening to the vehicle chassis component; an active actuating element connecting the first and second bearing elements; a first acceleration sensor for measuring an acceleration of the vehicle body; a control unit connected to the acceleration sensor and receiving a vertical acceleration of the vehicle body as input variable from the acceleration sensor, wherein the control unit influencing the active actuation element; and a second acceleration sensor arranged on the second bearing element. The object is also achieved by a method for damping high-frequency vibrations into a vehicle body via a vehicle chassis component, wherein the vehicle chassis component is connected to the vehicle structure via a damper bearing comprising a first bearing element and a second bearing element, wherein the method includes: measuring a vertical acceleration of the vehicle body and a vertical acceleration of the second bearing element; with a controller influencing an active actuating element arranged between the first bearing element and the second bearing element, wherein the first bearing element being connected to the vehicle body, wherein the second bearing element being connected to the vehicle chassis component, so that the vibration is reduced by minimizing the vertical acceleration of the vehicle body, wherein vertical acceleration of the second bearing element influences a behavior of the controller.

As is known, the damper system according to the invention provides a damper bearing to support a chassis component on the vehicle body. The damper system also has a first bearing element for fastening the bearing n the vehicle body and a second bearing element for fastening on the chassis component. Further, an active actuating element is provided between the vehicle body and the wheel carrier, which is actuated by a controller. The controller receives as input variable the acceleration of the vehicle body, particularly the vertical acceleration, for which an acceleration sensor is provided on the vehicle body.

According to the invention, the object is achieved in that the first bearing element and the second bearing element are connected by the active actuating element, and an acceleration sensor is provided, which is arranged on the second bearing element. This sensor consequently thus measures the vertical acceleration of the second bearing element.

The controller's input variables for actuating the active actuating element are therefore the vehicle structure acceleration and the acceleration of the second bearing element.

The controller is particularly configured to actuate the active actuating element so that the vertical acceleration of the vehicle structure is minimized. The regulation can be designed as PID, PD or where appropriate as PI-controller.

To further improve the damping, the second bearing element can be coupled to the chassis component via an elastomer connection. The vehicle chassis component can, for example, be a piston rod of a damper, wherein the piston rod is connected to an outer ring, which constitutes the second bearing element. This outer ring is provided with the acceleration sensor for the second bearing element. The outer ring is arranged on the vehicle body, particularly on the suspension-strut dome, via an active actuator, particularly a piezo-actuator.

In an advantageous embodiment of the invention, the acceleration sensor can be arranged close to, preferably on, the suspension-strut dome, in order to measure the vertical acceleration of the vehicle structure.

Essentially, the active actuating element operates opposite in phase to the movement of the outer ring. In order to transfer as little high-frequent vibration as possible to the suspension-strut dome.

As a result, the vertical acceleration of the body is considerably reduced in the area of the suspension-strut dome, which again minimizes the acoustic effects resulting from road excitation.

In the following, a method for damping high-frequency vibration into the vehicle body via the chassis component is proposed, wherein the vehicle chassis component is connected with a second bearing element via a damping element including a first bearing element with an active actuating element. By influencing the active actuating element, the regulation achieves minimizing the vertical acceleration of the vehicle body. The controller uses the vertical acceleration of the vehicle body as well as the vertical acceleration of the second bearing element as input variable, wherein the vehicle acceleration constitutes the control variable which has to be minimized.

In order to minimize the vehicle body acceleration it is provided according to the invention that the acceleration sensor, which is arranged on the second bearing element, detects the disturbance variable of the outer ring acceleration. This disturbance variable is taken into account by the control algorithm of the controller. Taking the disturbance variable into account, enables efficiently minimizing the regulation of the vehicle acceleration at the first bearing element.

Further advantages, features and possible applications of the aforementioned invention become apparent from the following description in connection with the exemplary embodiments shown in the drawings.

BRIEF DESCRIPTION OF THE DRAWING

The terms and reference signs used in the below-mentioned list of reference signs are used in the description, claims and the drawing. In the drawing it is shown in:

DETAILED DESCRIPTION OF PREFERRED EMBODIMENTS

Figure 1:
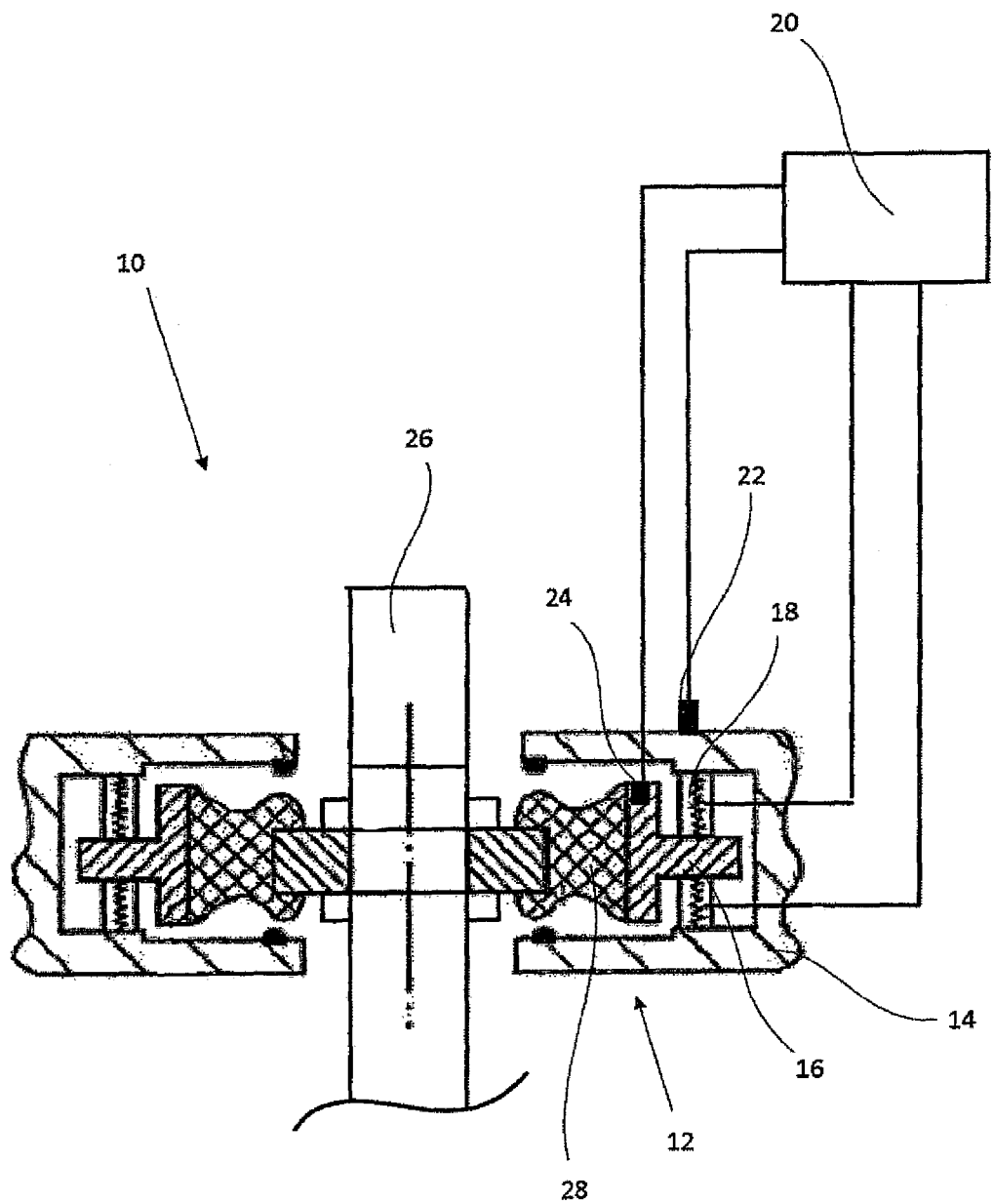
FIG. 1 a schematic view of a damping system and
FIG. 2 a symbolic representation of the control structure.

FIG. 1 shows a schematic view of the damper system 10. The damper system includes a damper bearing 12, which includes a first bearing element 14 and a second bearing element 16. The first bearing element 14 and the second bearing element 16 are connected by an active actuating element 18.

The active actuating element 18 can be influenced by a controller unit 20, to which it is connected for that purpose.

Furthermore, at least one acceleration sensor 22, 24 is provided on each of the first bearing element 14 and at the second bearing element 16, to measure the vertical acceleration of the respective bearing element.

As shown in FIG. 1, the first bearing element 14 is connected to the suspension-strut dome, i.e., to the vehicle body. The acceleration sensor 22 assigned to the first bearing element 14 consequently measures the acceleration of the vehicle body in this area.

The second bearing element 16 is configured as outer ring of an elastomer-bearing. The outer ring is connected to a vehicle chassis component, in the present case to a piston rod 26 of a suspension strut, via an elastomer-component 28.

For regulating the acceleration of the vehicle body the acceleration sensors 22, 24 are connected with the controller unit 20.

Figure 2:
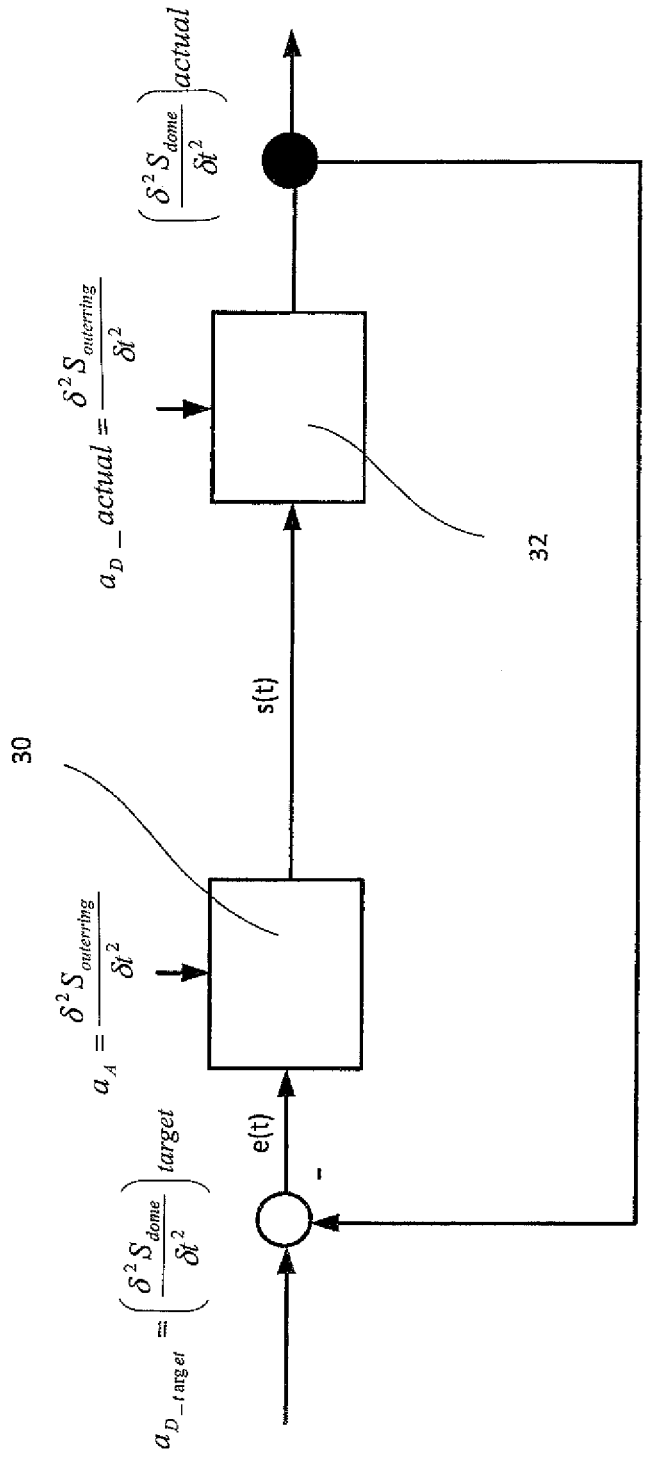

The functional principle will be further explained on the basis of the symbolical representation of the controller unit 20 in FIG. 2.

FIG. 2 shows the symbolic control structure 20 of the control unit 20.

The control unit 20 includes the controller 30. Input variable of the controller 30 is the deviation e(t), which results from the difference between the desired vertical acceleration of the vehicle body $(d^{2}s_{dome}/dt^{2})_{target}$ and the acceleration of vehicle body $(d^{2}s_{dome}/dt^{2})_{actual}=a_D$ measured by the acceleration sensor 22. In the present example the vehicle body acceleration corresponds to the acceleration of the suspension-strut dome.

The controller 30 outputs an actuating signal s(t) to actuate the active actuating element 18. The actuating signal is outputted by taking the acceleration of the second bearing element 16, here of the outer ring, into account $d^{2}s_{outer\ ring}/dt^{2}+a_A$. Because the acceleration of the outer ring is taken into account as disturbance variable in the control loop 32, an extremely efficient minimization of high-frequent vibrations in the vehicle structure can be ensured.

What is claimed is:

1. An active damper system for damping high-frequency vibration excitation of a vehicle body, comprising:
    a damper bearing to support a vehicle chassis component on the vehicle body, said damper bearing comprising a first bearing element for fastening to the vehicle body and a second bearing element for fastening to the vehicle chassis component, said second bearing element being coupled to the chassis component via an elastomer connection;
    an active actuating element connecting the first and second bearing elements;
    a first acceleration sensor for measuring an acceleration of the vehicle body;
    a second acceleration sensor arranged on the second bearing; and
    a control unit connected to the first and second acceleration sensors and receiving a vertical acceleration of the vehicle body as input variable from the first acceleration sensor, said control unit influencing the active actuating element.

2. The active damper system of claim 1, wherein the second bearing element is an outer ring of the damper bearing and is connected to a piston rod via an elastomer component.

3. A method for damping high-frequency vibrations into a vehicle body via a vehicle chassis component, said method comprising:
    providing a damper system which comprises a damper bearing to support a vehicle chassis component on the vehicle body, and an active actuating element connecting the first and second bearing elements, said damper bearing comprising a first bearing element for fastening to the vehicle body and a second bearing element for fastening to the vehicle chassis component, said second bearing element being coupled to the chassis component via an elastomer connection;
    measuring a vertical acceleration of the vehicle body with a first acceleration sensor;
    measuring a vertical acceleration of the second bearing element with a second acceleration sensor arranged on the second bearing element; and
    with the controller influencing the active actuating element so that the vibration is reduced by minimizing the vertical acceleration of the vehicle body, wherein the vertical acceleration of the second bearing element influences a behavior of the controller.

4. The method of claim 3, wherein the controller is constructed as PID, PI or PD-controller.

* * * * *